US010798959B2

(12) United States Patent
Son et al.

(10) Patent No.: US 10,798,959 B2
(45) Date of Patent: Oct. 13, 2020

(54) METHOD FOR PREPARING PERSIMMON JAM BY USING PERSIMMON AND PRUNUS MUME, AND PACKAGING CONTAINER FOR LONG-TERM STORAGE AND CONVENIENT USE THEREOF

(71) Applicants: Jin Hyun Son, Gyeongsan-si (KR); Won Soo Shin, Sangju-si (KR); Hyeon Ha Cho, Sangju-si (KR)

(72) Inventors: Jin Hyun Son, Gyeongsan-si (KR); Won Soo Shin, Sangju-si (KR); Hyeon Ha Cho, Sangju-si (KR)

( * ) Notice: Subject to any disclaimer, the term of this patent is extended or adjusted under 35 U.S.C. 154(b) by 28 days.

(21) Appl. No.: 15/302,252

(22) PCT Filed: Apr. 23, 2015

(86) PCT No.: PCT/KR2015/004045
§ 371 (c)(1),
(2) Date: Oct. 6, 2016

(87) PCT Pub. No.: WO2015/167166
PCT Pub. Date: Nov. 5, 2015

(65) Prior Publication Data
US 2017/0035084 A1    Feb. 9, 2017

(30) Foreign Application Priority Data

Apr. 29, 2014    (KR) ........................ 10-2014-0051867

(51) Int. Cl.
*A23L 21/10*      (2016.01)
*A23L 21/12*      (2016.01)
(Continued)

(52) U.S. Cl.
CPC ............... *A23L 21/11* (2016.08); *A23L 21/10* (2016.08); *A23L 21/12* (2016.08); *B65B 3/04* (2013.01);
(Continued)

(58) Field of Classification Search
CPC ..... B65D 85/72; B65D 83/0011; A23L 21/10; A23L 21/12; A23L 21/11; B65B 3/04
See application file for complete search history.

(56) References Cited

U.S. PATENT DOCUMENTS 6,892,906 B2    5/2005   Py et al.
6,957,752 B2    10/2005  Py et al.
(Continued)

FOREIGN PATENT DOCUMENTS

KR    10-1995-0030841 A    12/1995
KR    10-2003-0084028 A    11/2003
(Continued)

OTHER PUBLICATIONS

Machine translation of Description of published patent application KR20030084028A1.*
(Continued)

*Primary Examiner* — Subbalakshmi Prakash
(74) *Attorney, Agent, or Firm* — Rabin & Berdo, P.C.

(57) ABSTRACT

A method for preparing persimmon jam by using a persimmon and *Prunus mume*, and a packaging container for the long-term storage and convenient use thereof. The method for preparing persimmon jam by using a persimmon and *Prunus mume* provides storability and the specific flavor and taste of persimmon jam by adding a functional material of *Prunus mume* to semi-dried persimmons so as to prepare the persimmon jam, and a packaging container provides long-term storage and convenient use.

1 Claim, 2 Drawing Sheets

(51) Int. Cl.
  *B65D 85/72* (2006.01)
  *B65B 3/04* (2006.01)
  *B65D 83/00* (2006.01)

(52) U.S. Cl.
  CPC .......... *B65D 83/0011* (2013.01); *B65D 85/72* (2013.01)

(56) References Cited

U.S. PATENT DOCUMENTS

| | | |
|---|---|---|
| 7,290,573 B2 | 11/2007 | Py et al. |
| 7,637,401 B2 | 12/2009 | Py et al. |
| 7,798,185 B2 | 9/2010 | Py et al. |
| 8,220,507 B2 | 7/2012 | Py et al. |
| 8,672,195 B2 | 3/2014 | Py |
| 2003/0089743 A1 | 5/2003 | Py et al. |
| 2004/0112925 A1 | 6/2004 | Py et al. |
| 2005/0155987 A1 | 7/2005 | Py et al. |
| 2005/0263543 A1 | 12/2005 | Py et al. |
| 2008/0121668 A1 | 5/2008 | Py |
| 2008/0135130 A1 | 6/2008 | Py et al. |
| 2010/0140290 A1 | 6/2010 | Py |
| 2010/0327023 A1 | 12/2010 | Lee |
| 2010/0331808 A1 | 12/2010 | Py et al. |

FOREIGN PATENT DOCUMENTS

| | | |
|---|---|---|
| KR | 10-2007-0029878 A | 3/2007 |
| KR | 10-0746729 B1 | 8/2007 |
| KR | 10-0821873 B1 | 4/2008 |
| KR | 10-2014-0037358 A | 3/2014 |
| KR | 10-2014-0046508 A | 4/2014 |

OTHER PUBLICATIONS

Machine translation of Description of published patent application KR20140046508A1.*
KR20120009972 Abstrat and Machine translation of description Feb. 2012 (Year: 2012).*
Md Ali Asgar et al. Food Chemistry 81(2003) 555-560 (Year: 2003).*
Moon et al. Korean J. Dietary Culture vol. 3, No. 4(1988) (Year: 1988).*

* cited by examiner

METHOD FOR PREPARING PERSIMMON JAM BY USING PERSIMMON AND PRUNUS MUME, AND PACKAGING CONTAINER FOR LONG-TERM STORAGE AND CONVENIENT USE THEREOF

TECHNICAL FIELD

The present invention relates to a method for preparing persimmon jam by using a persimmon and a plum; and a packaging container for the long-term storage and convenient use thereof and, more specifically, to a method for preparing persimmon jam by using a persimmon and a plum and a packaging container for the long-term storage and convenient use thereof for providing storability and the specific flavor and taste of persimmon jam by adding a functional material of the plum to semi-dried persimmons so as to prepare the persimmon jam.

BACKGROUND ART

The persimmon has about moisture of 83%, which is comparatively smaller than other fruits. Also, the persimmon has a large sugar of more than 14% and most of the sugars include glucose and fructose, thereby having a good digestion-absorption.

In addition, the persimmon has a lot of beta-carotene of representing a vitamin A effect. The vitamin A is a nutrient capable of increasing the resistance to the disease and good for the skin elasticity.

A vitamin C is the most important nutrient in the persimmon and the vitamin C of about 30~50 mg is contained in the persimmon of 100 g, which is 6 times as much as an apple. However, the acidic taste thereof is weak.

The persimmon has a puckery taste unlike other fruits. The ingredient of the puckery taste is called tannins. Since the tannins are well soluble in water, it feels bitter. However, a sweet persimmon, a deastringent persimmon, and a dried persimmon have a sweet taste, because the tannins is changed to an insoluble material, which is not soluble in water. Also, the persimmon bred in cold region has a high tannin content in comparison with other regions.

During drying of the persimmon, the unique tissue and the taste of the dried persimmon are generated and the conservativeness thereof is increased owing to a reduction of moisture, a reduction of the puckery taste, and an increase of the a sweet taste etc.

However, most of the persimmons are dried to outside air. Accordingly, since external microorganisms and dirt can be easily attached thereto, there is a problem that it is unsanitary. Also, after drying thereof, since the mildew can be easily formed, it is difficult to store properly.

In addition, during drying thereof, since the persimmon turns dark red owing to a browning phenomenon, the persimmon loses goods value. Also, since the dry is conducted in an exposed state to the external environments such as a temperature difference between day and night and the dews etc., the appearance such as wrinkles can be generated and the surface thereof is hardened, thereby deteriorating the quality, the marketability, and the productivity etc.

Accordingly, various materials are added in the course of the dry process of the persimmon, so that it has been made efforts to improve the functionality, the marketability, and the quality thereof.

As the above result, a method for preparing a dried persimmon using a green tea and a ginseng is disclosed in Korea patent registration No. 10-0746729 and a method for preparing a dried persimmon using a red ginseng powder, a mushroom powder, and a green tea powder is disclosed in Korea Laid-Open Patent Publication No. 2007-0029878.

In the above methods, the nutrients available to the body are contained in the persimmon during dried persimmon production and it can improve the marketability and the usability in the course of the dried persimmon production. However, since the dried persimmon has a lot of sugars, it is difficult to store for long periods. Also, there is a problem in that the deterioration and corruption of the persimmons can be quickly proceeded, owing to the ginseng and red ginseng ingredients.

Therefore, where it manufactures the persimmon of high-quality by adding the functional materials to the persimmon, it must be considered along with the development of a method capable of preventing the deterioration and corruption of the prepared persimmon, thereby increasing the storability thereof.

CITATION LIST

Patent Literature

[Patent Literature 1]
Korea patent registration No. 10-0746729 (Aug. 6, 2007)
[Patent Literature 2]
Korea patent laying-open gazette No. 2007-0029878 (Mar. 15, 2007)

DISCLOSURE

Technical Problem

The present invention has been made in an effort to solve the problems of the conceptual description of the conventional art as described above, and an object of the present invention is to provide a method for preparing persimmon jam by using a persimmon and a plum and a packaging container for the long-term storage and convenient use thereof for providing storability and the specific flavor and taste of persimmon jam by adding a functional material of the plum (*Prunus mume*) to semi-dried persimmons so as to prepare the persimmon jam.

Technical Solution

According to one aspect of the present invention so as to accomplish these objects, there is provided to a method for preparing persimmon jam by using a persimmon and a plum including: a semi-dried persimmon preparing step (S100) for peeling a fresh persimmon and then, preparing a semi-dried persimmon using a drying apparatus or a natural drying; a plum enzyme preparing step (S200) for mixing 100 parts by weight of a sugar to 100 parts by weight of a plum, injecting the mixture into an aging container and then, aging the mixture for 90~110 days therein so as to prepare a plum enzyme; an aging step (S300) for removing a seed from the prepared semi-dried persimmon and soaking 100 parts by weight of the semi-dried persimmon in 100 parts by weight of the plum enzyme to be aged for 24 hours at room temperature; a mixing step (S400) for injecting 70 parts by weight of a material aged by the aging step and 30 parts by weight of a water into a milling machine to be mixed; a heating step (S500) for injecting a mixture included in the water into a heating cooker and heating at a temperature of 80~100° C. until an occurrence of bubbles; a persimmon jam forming step (S600) for lowering the heating temperature of a heating cooker during the occurrence of the bubbles and boiling it down so as to make the persimmon jam; and a product finishing step (S700) for putting the persimmon jam in a prepared persimmon jam packaging container to be sealed.

Advantageous Effects

According to the method for preparing persimmon jam by using the persimmon and the plum according to the present invention having the above constrictions and functions, there is effects in that it provides the storability and the specific flavor and taste of persimmon jam by adding a functional material of the plum to the semi-dried persimmons so as to prepare the persimmon jam.

In addition, it can be contributed to the increase of the added value in fruit farms owing to the unique active component and texture and the price competitiveness in comparison with other kinds of jams such as grapes or strawberries. In particular, it is reported that the factors of depending largely on the preservation of food are the contact with oxygen in the air or foreign matters (exterior fungus) and the packaging method of the conventional persimmon jam mainly uses the bottle. In this case, during eating thereof, since it opens the cap and the spoon etc. is inserted therein to eat the requirement every time, there are many problems in terms of the long-term storage of the jam and the food hygiene. However, according to the inventive packaging method, it can discharge the required amount thereof through the inside piston device and it can be perfectly sealed after the usage thereof, so that it has good preservability and food hygiene and has the syringe type packaging container designed to discharge the jam in a variety of patterns on the target foods, whereby a large effect on the consumer preference is predicted.

BRIEF DESCRIPTION OF DRAWINGS

The above and other objects, features and advantages of the present invention will be more apparent from the following detailed description taken in conjunction with the accompanying drawings, in which.

BEST MODE

Mode for Invention

Hereinafter, a method for preparing persimmon jam by using a persimmon and a plum (*Prunus mume*) and a packaging container for the long-term storage and convenient use thereof according to the present invention will be described in detail with reference to a preferred embodiment.

Figure 1:
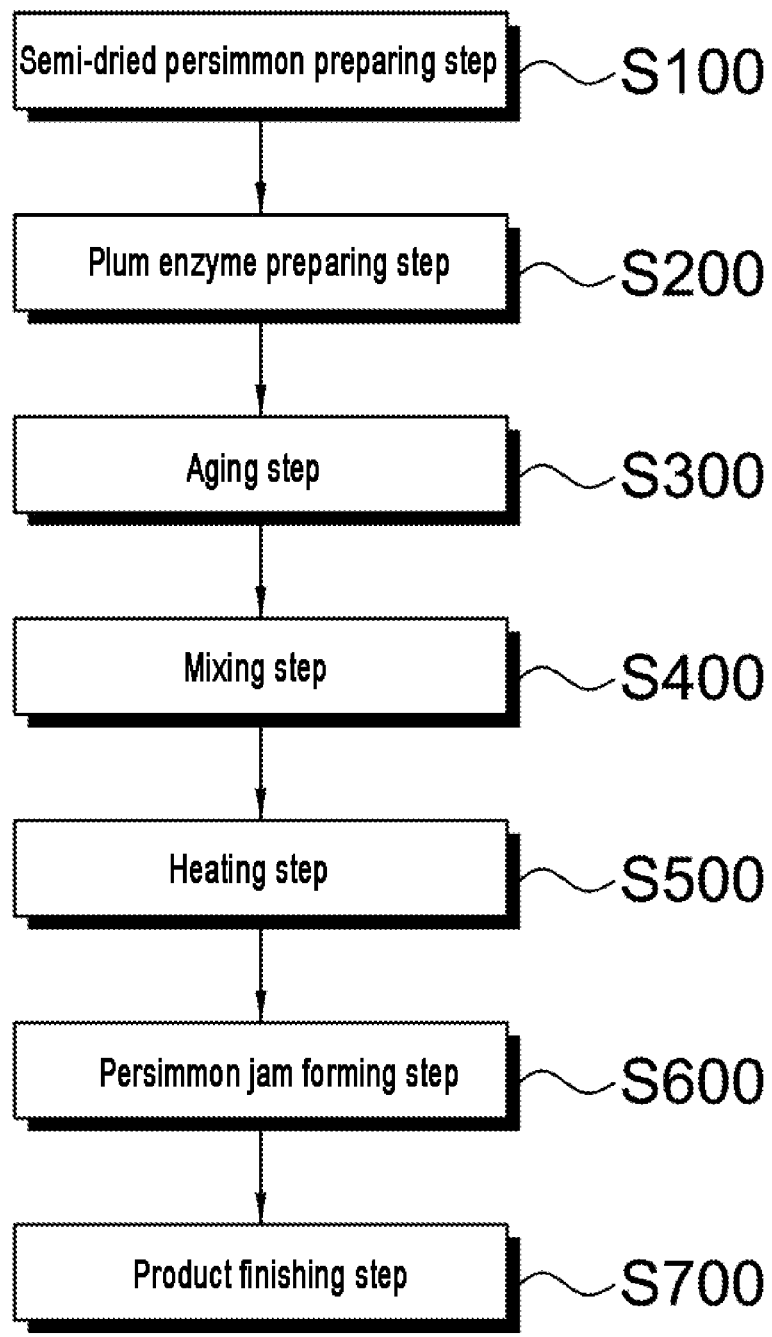
FIG. 1 is a flow chart illustrating a method for preparing persimmon jam by using a persimmon and a plum according to the present invention.

FIG. 1 is a flow chart illustrating a method for preparing persimmon jam by using a persimmon and a plum according to the present invention.

As shown in FIG. 1, the method for preparing persimmon jam by using the persimmon and the plum (*Prunus mume*) according to the present invention includes:

a semi-dried persimmon preparing step (S100) for peeling a fresh persimmon and then, preparing a semi-dried persimmon using a drying apparatus or a natural drying;

a plum enzyme preparing step (S200) for mixing 100 parts by weight of a sugar to 100 parts by weight of a plum (*Prunus mume*), injecting the mixture into an aging container and then, aging the mixture for 90~110 days therein so as to prepare a plum enzyme;

an aging step (S300) for removing a seed from the prepared semi-dried persimmon and soaking 100 parts by weight of the semi-dried persimmon in 100 parts by weight of the plum enzyme to be aged for 24 hours at room temperature;

a mixing step (S400) for injecting 70 parts by weight of a material aged by the aging step and 30 parts by weight of a water into a milling machine to be mixed;

a heating step (S500) for injecting a mixture included in the water into a heating cooker and heating at a temperature of 80~100° C. until an occurrence of bubbles;

a persimmon jam forming step (S600) for lowering the heating temperature of a heating cooker during the occurrence of the bubbles and boiling it down so as to make the persimmon jam; and a product finishing step (S700) for putting the persimmon jam in a prepared persimmon jam packaging container to be sealed.

In the semi-dried persimmon preparing step (S100), after the fresh persimmon is peeled, the semi-dried persimmon is prepared by using the drying apparatus.

More concretely, the tap of the harvested fresh persimmon is cleanly trimmed and then, the trimmed persimmon is thinly peeled by a peeling apparatus.

Preferably, the peeling thickness is about 1 mm.

Then, the outer portion of the peeled persimmon is dried by the drying apparatus and the inner portion of the peeled persimmon becomes soft.

In other words, a semi-dried state is manufactured to be a semi-dried persimmon. According to the National Institute of Korean Language, the semi-dried persimmon is defined to have about 55%~60% of moisture after a harvested persimmon is peeled and dried by cold-air drying or natural drying.

In the plum enzyme preparing step (S200), after 100 parts by weight of the sugar are mixed with 100 parts by weight of the plum to be injected into the aging container and aged for 90~110 days therein so as to prepare the plum enzyme.

More concretely, fully aged plums in a natural state are harvested, and water is removed after cleanly washing the harvested plums.

Thereafter, after 100 parts by weight of the sugar is mixed with 100 parts by weight of the plum to be injected into the aging container, the mixture is aged for 90~110 days therein so as to prepare the plum enzyme.

At this time, during aging thereof, it must be mixed well at intervals of 10 days in order that the plums are well aged. Here, after 100 days, it takes the plums out the aging container so as to prepare the plum enzyme.

The plum is good for fatigue and physical constitution improvement. Also, the plum serves to improve a liver function, protects the liver, and has excellent detoxifying properties.

In addition, the plum is good for an indigestion, a gastroenteric trouble, a chronic constipation, and a skin care. Also, the plum servers to lower a fever, eliminate the inflammation, increase the absorption of calcium, and provide a powerful bactericidal and insecticidal actions on the human body.

In present invention, the functionalities of the plum are provided to the semi-dried persimmon, so that the persimmon jam is manufactured.

In the aging step (S300), after the seed is removed from the prepared semi-dried persimmon, 100 parts by weight of the semi-dried persimmon are soaked, from which the seed is removed, in 100 parts by weight of the plum enzyme to be aged for 24 hours at room temperature;

More specifically, after the seed is removed from semi-dried persimmon, 100 parts by weight of the semi-dried persimmon are soaked in 100 parts by weight of the plum enzyme to be aged for 24 hours at room temperature.

Then, in the mixing step (S400), 70 parts by weight of the material aged by the aging step and 30 parts by weight of the water are injected into the milling machine to be mixed.

Continuously, in the heating step (S500), the mixture included in the water is injected into the heating cooker and heats at a temperature of 80~100° C. until the occurrence of the bubbles.

Thereafter, in the persimmon jam forming step (S600), the heating temperature of the heating cooker is lowered during the occurrence of the bubbles and boils it down so as to make the product (persimmon jam).

Finally, in the product finishing step (S700), the persimmon jam is put in the prepared persimmon jam packaging container to be sealed, thereby completing the product.

Referring to an example, firstly, after the fresh persimmon is peeled and then, the semi-dried persimmon is prepared by using the drying apparatus.

Then, the sugar of 10 kg is fully mixed with the plum of 10 kg and the mixture is injected into the aging container and then, puts a lid thereon and ages the mixture for 90~110 days therein so as to prepare the plum enzyme.

Then, after the seed is removed from the prepared semi-dried persimmon and soaks the semi-dried persimmon of 10 kg in the plum enzyme of 10 kg to be aged for 24 hours at room temperature.

Then, the aged material of 7 kg and the water of 3 kg are injected into the milling machine to be mixed.

Then, the mixture included in the water is injected into the heating cooker and heats at a temperature of 80~100° C. until then occurrence of bubbles. Thereafter, the heating temperature of the heating cooker is lowered during the occurrence of the bubbles and boils it down so as to make the persimmon jam.

Finally, the persimmon jam is put in the prepared persimmon jam packaging container to be sealed, thereby completing the product production.

EXAMPLE: PERSIMMON JAM MADE IN ACCORDANCE WITH THE PRESENT INVENTION

There is the persimmon jam produced according to the conditions set out in above example.

COMPARATIVE EXAMPLE: PERSIMMON JAM MADE SEMI-DRIED PERSIMMON OF 7 KG AND PLUM ENZYME OF 3 KG

Firstly, a sugar of 10 kg is fully mixed with a plum of 10 kg and injects the mixture into an aging container and then, puts a lid thereon and ages the mixture for 90~110 days therein so as to prepare the plum enzyme.

Then, after the seed is removed from the prepared semi-dried persimmon and soaks the semi-dried persimmon of 7 kg in the plum enzyme of 3 kg to be aged for 24 hours at room temperature. Then, the aged material of 7 kg and the water of 3 kg are injected into the milling machine to be mixed.

Then, the mixture included in the water is injected into the heating cooker and heats at a temperature of 80~100° C. until then occurrence of bubbles. Thereafter, the heating temperature is lowered during the occurrence of the bubbles and boils it down so as to make the persimmon jam.

Experiment 1: Sensory Test

A sensory test is carried out on the persimmon jam (example) according to the present invention and the persimmon jam (comparative example), in that the amount of the semi-dried persimmon is larger than that of the plum enzyme, by means of sensory test agents (30 agents having at least two years sensory test experience; 15 males and 15 females), dividing into taste, flavor, color and overall preference (five-point measurement: 1: very poor, 2: poor, 3: average, 4: good, 5: very good). The results are shown in Table 1.

TABLE 1

|  | taste | Flavor | color | overall preference |
|---|---|---|---|---|
| Example | 5 | 4 | 5 | 5 |
| Comparative example | 2 | 2 | 3 | 3 |

As can be seen from the Table 1, the example shows high scores in all items in comparison with the comparative example.

That is, the example of the present invention has higher points than the comparative embodiment in all items. In the persimmon jam according to the present invention, since the plum (*Prunus mume*) neutralizes the distinctive aroma and flavor of the persimmon, it has higher points than the persimmon jam of the comparative embodiment in all items such as taste, flavor, and color.

If the persimmon jam prepared by the above method is tasted with the bread etc., unique functional materials of the persimmon and the plum can be taken and it is convenient to eat in a busy society.

On the other hand, in order to solve the eating discomfort, the persimmon jam packaging container for containing the persimmon jam therein utilizes a syringe type packing container.

Figure 2:
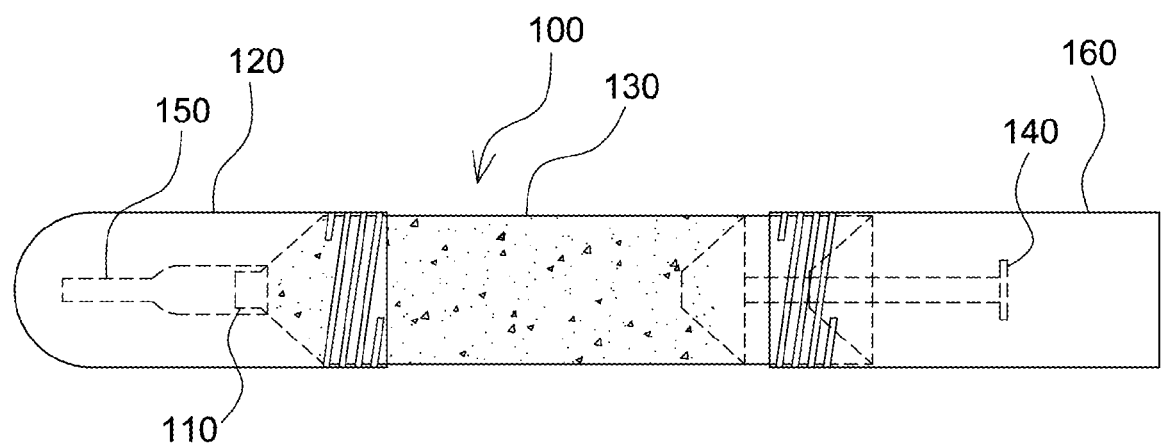
FIG. 2 is a sectional view illustrating a packaging container for the long-term storage and convenient use thereof according to the present invention.

As shown in FIG. 2, the persimmon jam packaging container (100) includes:

an outlet (110) for discharging the persimmon jam to outside located on one end of a main body;

a stopper (120) having a screw groove coupled to a screw thread, which is formed at the main body;

the main body (130) having a tube for filling the persimmon jam therein and the screw thread formed at both sides;

a pressure push stick (140) located at the other end of the main body opposed to the outlet and formed to be gradually introduced into an inside of the main body so as to discharge the persimmon jam to outside; and a push stick protective cap (160) having a screw groove coupled to the screw thread of the main body so as to protect the pressure push stick.

The outlet (110) is located on one end of the main body so at to discharge the persimmon jam to outside.

As described above, the outlet and the pressure push stick are protected through the stopper and the push stick protective cap.

In case of the conventional syringe type packaging container, if it is pressed, the corresponding liquid etc. is easily discharged. Accordingly, if the children accidentally presses the packaging container of the present invention, the persimmon jam is easily exposed to outside. However, the stopper and the push stick protective cap can server to avoid this problem.

The main body (130) has the tube for filling the persimmon jam therein and the screw thread formed at both sides.

The pressure push stick (140) serves to discharge the persimmon jam to outside and is located at the other end of the main body opposed to the outlet and formed to be gradually introduced into an inside of the main body.

On the other hand, the persimmon jam packaging container further includes a persimmon jam discharge portion 150 coupled to an outside of the outlet and made of an elastic material such as a silicon material or an urethane material.

In other words, the persimmon jam discharge portion of the silicon material is coupled to the outlet formed at the main body, so that it is very useful when the persimmon jam is spread on bread.

According to the present invention, the functional materials of the plum are added to the semi-dried persimmon to prepare the persimmon jam, thereby providing a storability of the persimmon jam and distinctive flavor and taste thereof.

Since the persimmon jam discharge portion is a soft such as a silicon material or an urethane material and an end of the pressure push stick is corresponded to the outlet in terms of a shape, the persimmon jam stored in the main body can be discharged to outside to the end.

Since the description of the present invention is a mere embodiment for structural and functional description m, it must not be interpreted that the scope of the present invention is limited by the embodiments described in the text. That is, since the embodiments can be variously changed and have various forms, it should be understood that the scope of the invention includes the equivalents for realizing the technical concept. Also, since the specific embodiments do not include all objects and effects presented by the present invention, the scope of the present invention is not limited by them.

While the present invention has been described with respect to the specific embodiments, it will be apparent to those skilled in the art that various changes and modifications may be made without departing from the spirit and scope of the present invention as defined in the following claims.

INDUSTRIAL APPLICABILITY

According to the present invention, the functional materials of the plum are added to the semi-dried persimmon to prepare the persimmon jam, so that it provides a storability of the persimmon jam and distinctive flavor and taste thereof, thereby being utilized in the field of the manufacturing using a persimmon and a plum.

What is claimed is:
1. A method for preparing persimmon jam by using a persimmon and a plum consisting of:

a semi-dried persimmon preparing step including peeling a fresh persimmon to a thickness of about 1 mm peel thickness and then, drying the peeled persimmon by a natural drying, wherein a semi-dried persimmon is defined that only a shell portion of the peeled persimmon is dried by the natural drying and an inside portion of the peeled persimmon is soft;

a plum enzyme preparing step including mixing 100 parts by weight of a sugar to 100 parts by weight of a plum, injecting a mixture of the sugar and the plum into an aging container and then, aging for about 90 to 110 days therein so as to prepare a plum enzyme, wherein the mixture of the sugar and the plum in the aging container is stirred at intervals of 10 days during the aging, wherein the plum enzyme consists of the 100 parts by weight of the sugar and the 100 parts by weight of the plum;

a first mixture preparing step including mixing 100 parts by weight of the semi-dried persimmon to 100 parts by weight of the plum enzyme after a seed is removed from the prepared semi-dried persimmon, wherein the first mixture consists of the 100 parts by weight of a deseeded semi-dried persimmon and the 100 parts by weight of the plum enzyme;

an aging step including aging the first mixture for 24 hours at room temperature;

a second mixture preparing step including mixing 70 parts by weight of the aged mixture by the aging step and 30 parts by weight of a water into a milling machine for milling;

a heating step including injecting the milled mixture into a heating cooker and heating at a temperature of 80-100° C. until an occurrence of bubbles;

a persimmon jam forming step including lowering the heating temperature of the heating cooker during the occurrence of the bubbles and boiling down so as to make the persimmon jam; and a packaging step including putting the persimmon jam in a prepared persimmon jam packaging container,
wherein, the persimmon jam packaging container comprises;
an outlet for discharging the persimmon jam to outside located on one end of a main body;
a stopper having a screw groove coupled to a screw thread, which is formed at the main body;
the main body having a tube for filling the persimmon jam therein and the screw thread formed at both sides;
a pressure push stick located at the other end of the main body opposed to the outlet and formed to be gradually introduced into an inside of the main body so as to discharge the persimmon jam to outside;
a push stick protective cap having a screw groove coupled to the screw thread of the main body so as to protect the pressure push stick; and
a persimmon jam discharge portion coupled to an outside of the outlet and made of a silicone or an urethane.

* * * * *